US008080599B2

(12) United States Patent
Ding et al.

(10) Patent No.: US 8,080,599 B2
(45) Date of Patent: Dec. 20, 2011

(54) THERMOPLASTIC POLYESTER COMPOSITIONS, METHODS OF MANUFACTURE, AND ARTICLES THEREOF

(75) Inventors: Tianhua Ding, Evansville, IN (US); Rodney Fonseca, Newburgh, IN (US); Sung Dug Kim, Newburgh, IN (US); Chris Van Der Weele, Sommelsdijk (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/565,135

(22) Filed: Sep. 23, 2009

(65) Prior Publication Data

US 2011/0071240 A1 Mar. 24, 2011

(51) Int. Cl.
*C08K 5/5313* (2006.01)
(52) U.S. Cl. .................................. 524/126; 524/133
(58) Field of Classification Search ............ 524/126, 524/133
See application file for complete search history.

(56) References Cited

U.S. PATENT DOCUMENTS

| | | | | |
|---|---|---|---|---|
| 4,081,422 | A | * | 3/1978 | Cordes et al. ............ 524/130 |
| 6,013,707 | A | * | 1/2000 | Kleiner et al. ............ 524/126 |
| 6,255,371 | B1 | | 7/2001 | Schlosser et al. |
| 2001/0007888 | A1 | * | 7/2001 | Asano ........................ 524/115 |
| 2007/0275242 | A1 | | 11/2007 | Gopal et al. |
| 2008/0139711 | A1 | * | 6/2008 | Borade et al. ............. 524/100 |
| 2009/0198010 | A1 | * | 8/2009 | Eckel et al. ............... 524/451 |

FOREIGN PATENT DOCUMENTS

| | | |
|---|---|---|
| EP | 1967549 A1 | 9/2008 |
| JP | 8073720 A | 3/1996 |

OTHER PUBLICATIONS

International Search Report and Written Opinion; International Application No. PCT/US2010/049929; International Filing Date Sep. 23, 2010; 11 pages.
Dupont Product and Properties Guide for Hytrel Polyester Elastomer, 12 pages.

\* cited by examiner

*Primary Examiner* — Peter Szekely
(74) *Attorney, Agent, or Firm* — Cantor Colburn LLP; Diderico van Eyl

(57) ABSTRACT

A thermoplastic polyester composition comprises, based on the total weight of the composition, from 20 to 95 wt. % of a polyester comprising a poly(alkylene terephthalate); from 1 to 35 wt. % of a phosphorous flame retardant consisting of a phosphinate of the formula (I)

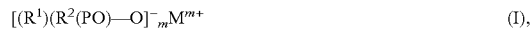

a diphosphinate of the formula (II)

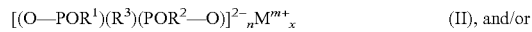

a polymer derived from the phosphinate of formula (I) or the diphosphinate of the formula (II); from 0.1 to less than 20 wt. % of a copolyetherester; from 0.1 to 5 wt. % of an anti-dripping agent; from 0 to 4.5 wt. % of a reinforcing fiber; and from 0 to 5 wt. % of an additive selected from the group consisting of a mold release agent, an antioxidant, a thermal stabilizer, and a UV stabilizer.

33 Claims, No Drawings

THERMOPLASTIC POLYESTER COMPOSITIONS, METHODS OF MANUFACTURE, AND ARTICLES THEREOF

BACKGROUND

This disclosure relates to thermoplastic polyester compositions, methods of manufacture, and articles thereof.

Thermoplastic polyesters, such as poly(alkylene terephthalate)s, are readily molded into useful articles, and articles comprising thermoplastic polyesters have valuable characteristics including strength, toughness, high gloss, and solvent resistance. Thermoplastic polyesters therefore have utility for a wide range of applications, including automotive parts, electric appliances, and electronic devices. Because of their widespread use, particularly in electronic applications, it is desirable to provide flame retardance to thermoplastic polyesters.

Numerous flame retardants (FR) for thermoplastic polyesters are known, but many contain halogens, usually chlorine and/or bromine. Halogenated flame retardant agents are undesirable because of the increasing demand for ecologically friendly materials. Articles comprising halogenated flame retardants emit toxic and corrosive hydrochloric acid and/or hydrobromic acid when burned, and pose a water and/or soil pollution hazard when disposed of in the environment. Halogen-free flame retardants, such as phosphorus- and nitrogen-based compounds are known. However there is a need to improve the flame retardance of thin molded articles containing phosphorus- and nitrogen-based flame retardants.

More ecologically friendly FR (eco-FR) thermoplastic polymer compositions comprising aluminum phosphinate or diphosphinate and melamine compounds have been developed to replace compositions comprising halogenated flame retardants. However, these eco-FR compositions possess poor mechanical properties, including reduced impact strength and tensile strength, as well as poor flow properties compared to compositions having halogenated flame retardants. The addition of small amounts of a polyetherimide (PEI), in particular ULTEM 1010 from SABIC Innovative Plastics, can boost the mechanical properties of the eco-FR compositions. However, PEI lowers the comparative tracking index (CTI) compared to halogenated frame retardants, i.e. it increases the tendency to form conductive leakage paths on the surface of the molded article.

Thus, there remains a need for eco-FR thermoplastic polyester compositions having good flame retardant properties when molded into thin sections, and at the same time having comparable or improved mechanical properties, including ductility, tensile strength, and stiffness relative to compositions comprising halogenated flame retardants.

BRIEF SUMMARY OF THE INVENTION

A thermoplastic polyester composition comprises, based on the total weight of the composition, from 20 to 95 wt. % of a polyester comprising a poly(alkylene terephthalate); from 1 to 35 wt. % of a phosphorous flame retardant consisting of a phosphinate of the formula (I)

a diphosphinate of the formula (II)

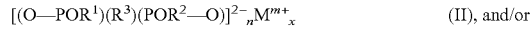

a polymer derived from the phosphinate of formula (I) or the diphosphinate of the formula (II), wherein $R^1$ and $R^2$ are identical or different and are H, $C_1$-$C_6$ linear or branched alkyl, or $C_6$-$C_{10}$ aryl; and $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2; from 0.1 to less than 20 wt. % of a copolyetherester; from 0.1 to 5 wt. % of an anti-dripping agent; from 0 to 4.5 wt. % of a reinforcing fiber; and from 0 to 5 wt. % of an additive selected from the group consisting of a mold release agent, an antioxidant, a thermal stabilizer, and a UV stabilizer.

A method for the manufacture of the thermoplastic polyester composition, comprises blending the components of the composition.

Further disclosed are articles comprising the thermoplastic polyester composition. Methods of manufacturing an article comprise shaping by extrusion, calendaring, molding, or injection molding the thermoplastic polyester composition.

The above described and other features are exemplified by the following detailed description.

DETAILED DESCRIPTION OF THE INVENTION

Our invention is based on the discovery that it is now possible to make a thermoplastic polyester composition having a combination of desirable flame retardance and mechanical properties, including ductility, tensile strength and stiffness, without using halogenated flame retardants. The thermoplastic polyester composition comprises a polyester; a phosphinate of formula I and/or diphosphinate of formula II and/or their polymers as described below; a copolyetherester; an anti-dripping agent; and optionally a reinforcing fiber.

A thermoplastic polyester composition comprising a polyester; a phosphinate of formula I and/or diphosphinate of formula II and/or their polymers as described below; a copolyetherester; an anti-dripping agent; and optionally a reinforcing fiber, has excellent flame retardancy for both thick and thin articles in the absence of a halogenated organic flame retardant. In particular, the thermoplastic polyester composition has a UL-94 flammability rating of V0. At the same time, the thermoplastic polyester composition also has useful mechanical properties, in particular good tensile elongation at break, tensile stress at break, and flexural modulus. Moreover its tensile elongation at break is greater than its tensile elongation at yield, an indication of good ductility.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

The thermoplastic polyester composition comprises a polyester, in particular a poly(alkylene terephthalate), wherein the alkylene group comprises 2 to 18 carbon atoms. Examples of alkylene groups are ethylene, butylene, trimethylene, pentylene, hexylene, cyclohexylene, 1,4-cyclohexanedimethylene, and a combination of at least one of the foregoing alkylene groups. In a specific embodiment, the alkylene group is butylene. Specific examples of poly(alkylene terephthalate) are poly(ethylene terephthalate) poly(butylene terephthalate), poly(trimethylene terephthalate), and poly(1,4-cyclohexanedimethylene terephthalate).

In a specific embodiment, the polyester is poly(butylene terephthalate) (PBT). The PBT has an intrinsic viscosity of 0.4 to 2.0 deciliters per gram (dL/g), specifically 0.5 to 1.5 dL/g, more specifically 0.6 to 1.2 dL/g, as measured in a 60:40 by weight phenol/1,1,2,2-tetrachloroethane mixture at 23° C. The PBT can have a weight average molecular weight of 10,000 to 200,000 Daltons, specifically 50,000 to 150,000 Daltons as measured by gel permeation chromatography (GPC). If PBT that has a weight average molecular weight less than 10,000 Daltons is used, the mechanical properties of the compositions after molding are unsatisfactory. On the other hand, if the weight average molecular weight is greater than 200,000 Daltons, the moldability decreases. The polyester component can also comprise a mixture of different batches of PBT prepared under different process conditions in order to achieve different intrinsic viscosities and/or weight average molecular weights.

The thermoplastic polyester composition can also comprise other polyesters and/or other polymers, in an amount of from more than 0 to 30 weight percent (wt. %), based on the total weight of the polyesters and other polymers in the thermoplastic polyester composition. For example, a thermoplastic polyester composition comprising poly(butylene terephthalate) can comprise from 1 to 30 wt. % percent, based on the total weight of the polyesters and other polymers in the thermoplastic polyester composition, of a second polyester, for example poly(ethylene terephthalate), poly(ethylene naphthalate), poly(1,4-butylene naphthalate), poly(trimethylene terephthalate), poly(1,4-cyclohexanedimethylene 1,4-cyclohexanedicarboxylate), poly(1,4-cyclohexanedimethylene terephthalate), poly(1,4-butylene-co-1,4-but-2-ene diol terephthalate), poly(1,4-cyclohexanedimethylene-co-ethylene terephthalate), or a combination comprising at least one of the foregoing polyesters. Alternatively, the thermoplastic polyester composition can comprise 1 to 10 wt. %, based on the total weight of the polyester and other polymers in the composition, of a polycarbonate and/or an aromatic copolyester carbonate. In a specific embodiment, the polyester consists only of poly(1,4-butylene terephthalate). In another embodiment, the polyester consists of at least 70 wt. % poly(butylene terephthalate).

Polyesters can be obtained by interfacial polymerization or melt-process condensation, by solution phase condensation, or by transesterification polymerization wherein, for example, a dialkyl ester such as dimethyl terephthalate can be transesterified with 1,4-butanediol using acid catalysis, to generate poly(1,4-butylene terephthalate). It is possible to prepare a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

A catalyst component facilitates the reaction, and can be selected from antimony compounds, tin compounds, titanium compounds, combinations thereof as well as many other metal catalysts and combinations of metal catalysts that have been disclosed in the literature. The amount of catalyst required to obtain an acceptable polymerization rate at the desired polymerization temperature will vary, and can be determined by experimentation. The catalyst amount can be 1 to 5000 ppm, or more.

The polyester can be present in the thermoplastic polyester composition in an amount from 20 to 95 wt. %, based on the total weight of the composition. Within this range, it is preferred to use at least 50 wt. %, specifically at least 70 wt. %, of the polyester. In one embodiment, the polyester is present in an amount from 50 to 95 wt. %, based on the total weight of the thermoplastic polyester composition, specifically from 60 to 95 wt. %, more specifically from 70 to 90 wt. %, each amount based on the total weight of the composition.

The thermoplastic polyester composition comprises a flame retarding quantity one or more phosphinic acid or diphosphinic acid salts. As used herein, the terms "phosphinate" and "diphosphinate" refer to "phosphinic acid salt" and "diphosphinic acid salt," respectively, and to polymers thereof. The phosphinates and diphosphinates include those set forth in U.S. Pat. No. 6,255,371 to Schosser et al. The specification of this patent, column 1, line 46 to column 3 line 4 and column 6, lines 19 to 56 is incorporated by reference into the present specification. The phosphinates are of the formula (I)

the formula (II)

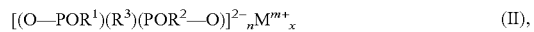

and/or polymers comprising formula (I) or (II), wherein $R^1$ and $R^2$ are identical or different and are H, $C_1$-$C_6$ linear or branched alkyl, or $C_6$-$C_{10}$ aryl; and $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2.

In one embodiment $R^1$ and $R^2$ are the same and are $C_1$-$C_6$-linear or branched alkyl, or phenyl; $R^3$ is $C_1$-$C_{10}$-linear or branched alkylene, $C_6$-$C_{10}$-arylene, -alkylarylene or -arylalkylene; M is magnesium, calcium, aluminum, zinc, or a combination thereof; m is 1, 2 or 3; n is 1, 2 or 3; and x is 1 or 2.

The phosphinate of formula (I) and the diphosphinate of formula (II) are incorporated by reference from the Schosser patent into the instant application. In the instant disclosure, $R^1$ and $R^2$ can be H, in addition to the substituents set forth in the patent. When $R^1$ and $R^2$ are H, the phosphinate of formula (I) is a hypophosphite. Examples of hypophosphites are calcium hypophosphite, aluminum hypophosphite, and the like.

The amount of phosphinate, diphosphinate, or polymers thereof, in the thermoplastic polyester composition can be from 1 to 35 wt. %, specifically from 5 to 20 wt. %, and more specifically from 10 to 15 wt. %, based on the total weight of the composition.

In a specific embodiment M is aluminum, and the thermoplastic polyester composition comprises from 1 to 35 wt. %, specifically from 7 to 20 wt. %, and more specifically from 10 to 15 wt. %, based on the total weight of the composition, of a phosphinate of the formula (Ia)

a diphosphinate of the formula (Ia)

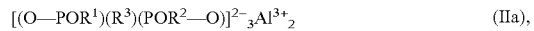

and/or a polymer comprising formula (Ia) or (IIa), wherein $R^1$ and $R^2$ are identical or different and are H, $C_1$-$C_6$ linear or branched alkyl, or $C_6$-$C_{10}$ aryl; and $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene.

Specific examples of phosphinate (I) are aluminum diethylphosphinate (DEPAL) and zinc diethylphosphinate (DEPZN).

The thermoplastic polyester composition further comprises a copolyetherester having long-chain ester units of the formula (III):

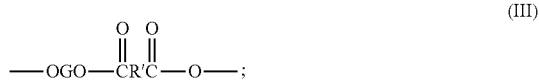
(III)

and short-chain ester units having units of the formula (IV):

(IV)

wherein R' is the divalent aromatic radical remaining after removal of the carboxyl groups from terephthalic acid, isophthalic acid, or a combination of terephthalic acid and isophthalic acid; G is the divalent polyalkylene oxide radical remaining after removal of the terminal hydroxyl groups from a poly(alkylene oxide) glycol having a number-average molecular weight of 100 to 2500; and D is the divalent alkylene radical remaining after removal of the hydroxyl groups from aliphatic diols having a molecular weight from 62 to 286.

Examples of divalent alkylene radicals are ethylene radicals, butylene radicals, trimethylene radicals, pentylene radicals, hexylene radicals, cyclohexylene radicals, or a combination of at least one of the foregoing radicals. In a specific embodiment, the divalent alkylene radical is butylene.

The amounts of the short-chain ester units and the long-chain ester units can vary. For instance, the short-chain ester units can constitute 40 to 90 wt. % of the copolyetherester, and the long-chain ester units can constitute 10 to 60 wt. % of the copolyetherester. In another embodiment, the divalent alkylene radical D and the divalent polyalkylene oxide radical G are present in a weight ratio ranging from 80:20 to 50:50.

A specific example of a copolyetherester is polybutylene terephthalate polytetrahydrofuran block copolymer. Copolyetheresters comprising polybutylene terephthalate and poly(tetrahydrofuran) blocks are commercially available from DuPont Co. under the HYTREL trade name and from DSM under the ANITEL trade name. Examples of commercially available copolyetheresters are HYTREL 4056, 4556, and 6356, and ARNITEL EL630 and EM400. Chemical and physical properties of these copolyetheresters are shown in Table 1.

TABLE 1

| | Copolyetherester Chemical and Physical Properties | | | | | | |
|---|---|---|---|---|---|---|---|
| | | | HYTREL ® 4056 | HYTREL ® 4556 | HYTREL ® 6356 | ARNITEL ® EL630 | ARNITEL ® EM400 |
| DSC Data | Melting Point | (° C.) | 150 | 193 | 210 | 213 | −1, 195 |
| | Crystallization Temperature | (° C.) | 63 | 124 | 152 | 155 | 102 |
| | $\Delta H_{fusion}$ | (kJ/kg) | 11 | 10 | 22 | 24 | 9, 11 |
| | $\Delta H_{crystallization}$ | (kJ/kg) | −14 | −20 | −28 | −31 | −12 |
| GPC Data | Mw/Mn | kg/mol | 131/62 | 125/52 | 111/49 | 96/49 | 102/49 |
| Viscosity | I.V. | dl/g | 1.46 | 1.46 | 1.22 | 1.1 | 1.41 |
| Hardness | Shore D | | 36 | 42 | 55 | 56 | 33 |
| Softening point | Vicat iso | (° C.) | 110 | 158 | 196 | 198 | 134 |
| NMR Data | pTHF segment Mn | g/mol | 1000 | 1000 | 1000 | 1000 | 2000 |
| | THF Repeat Unit | wt. % | 44.9 | 49.9 | 26.8 | 24.5 | 59.6 |
| | EG Repeat Unit | wt. % | 0.0 | 0.0 | 0.0 | 0.0 | 0.0 |
| | BDO Repeat Unit | wt. % | 16.1 | 15.2 | 23.0 | 24.0 | 12.0 |
| | Isophthalic Repeat Unit | wt. % | 8.4 | 0.0 | 0.0 | 24.0 | 12.0 |
| | Terephthalic Repeat Unit | wt. % | 30.6 | 34.9 | 50.2 | 51.4 | 28.4 |
| Tensile Data | Modulus of Elasticity | MPa | 66 | 85 | 324 | 389 | 49 |
| | | (std) | (1.1) | (0.7) | (6.6) | (4.4) | (0.4) |
| | Stress at 5% Strain | MPa | 2.8 | 3.6 | 11.1 | 12 | 2.2 |
| | | (std) | (0.1) | (0.1) | (0.2) | (0.1) | (0.1) |
| | Stress at 10% Strain | MPa | 4.5 | 4.5 | 15.7 | 16.6 | 3.6 |
| | | (std) | (0.1) | (0.1) | (0.2) | (0.1) | (0.1) |
| | Stress at Max Strain | MPa | 9.6 | 13.1 | 25.8 | 25.1 | 9.9 |
| | | (std) | (0.1) | (0.1) | (0.2) | (0.2) | (0.1) |
| | Max Strain | % | 287 | 303 | 311 | 284 | 310 |
| | | (std) | (5.5) | (1.1) | (2) | (0.3) | (1.5) |

The amount of copolyetherester in the thermoplastic polyester composition can be from 0.1 to less than 20 wt. %, specifically from 1 to 18 wt. %, and more specifically from 2.5 to 15 wt. %, based on the total weight of the composition.

The composition further comprises one or more anti-dripping agents, which prevent or retard the resin from dripping while the resin is subjected to burning conditions. Examples of such agents include silicone oils, silica (which also serves as a reinforcing filler), asbestos, and fibrillating-type fluoropolymers. Examples of fluoropolymers include fluorinated polyolefins such as poly(tetrafluoroethylene), tetrafluoroethylene/hexafluoropropylene copolymers, tetrafluoroethylene/ethylene copolymers, poly(vinylidene fluoride), poly(chlorotrifluoroethylene), and the like, and mixtures comprising at least one of the foregoing anti-dripping agents. A preferred anti-dripping agent is poly(tetrafluoroethylene) encapsulated by a poly(styrene-co-acrylonitrile) (SAN) copolymer. The anti-dripping agent is present in an amount of 0.01 to 5 wt. %, specifically from 0.05 to 2 wt. %, and more specifically 0.1 to 1 wt. %, based on the total weight of the thermoplastic polyester composition.

The thermoplastic polyester composition can optionally comprise a reinforcing fiber. Any rigid reinforcing fiber can be used, for example, a glass fiber, a carbon fiber, a metal fiber, a ceramic fiber or whisker, and the like. The fibers can be chopped or continuous.

In some applications it can be desirable to treat the surface of the fiber with a chemical coupling agent to improve adhesion to the polyester in the thermoplastic polyester composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into articles.

The fibers can have diameters of 6 to 30 micrometers. The reinforcing fibers can be provided in the form of monofilaments or multifilaments and can be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Reinforcing fibers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In one embodiment, the reinforcing fiber is a glass fiber. An exemplary glass fiber is one that is relatively soda free, specifically fibrous glass filaments comprising lime-alumino-borosilicate glass, which is also known as "E" glass. In a specific embodiment the glass fiber has a diameter of 10 to 13 micrometers.

The glass fibers can be flat. Exemplary flat glass fibers have a modulus of greater than or equal to 6,800 megaPascals (MPa), and can be chopped or continuous. The flat glass fiber can have various cross-sections, for example, trapezoidal, rectangular, or square.

In preparing the molding compositions it is convenient to use a glass fiber in the form of chopped strands having an average length of from 0.1 mm to 10 mm, and having an average aspect ratio of 2 to 5. In articles molded from the compositions on the other hand shorter lengths will typically be encountered because during compounding considerable fragmentation can occur.

When used, the glass fiber is present in an amount of 0.1 to 4.5 wt. %, more specifically 0.5 to 4 wt. %, and still more specifically 1 to 2.5 wt. %, based on the weight of the thermoplastic polyester composition. When amounts less than 0.1 wt. % are used, there is no improvement in flexural modulus or tensile strength (tensile stress at yield). When amounts greater than or equal to 5 wt. % are used, the thermoplastic polyester composition will not meet the UL94 V0 performance standard at a thickness of 0.8 mm and will not be sufficiently ductile.

The thermoplastic polyester compositions can optionally comprise a non-fibrous inorganic filler, which can impart additional beneficial properties to the compositions such as thermal stability, increased density, stiffness, and/or texture. Non-fibrous inorganic fillers include, but are not limited to, alumina, amorphous silica, alumino silicates, mica, clay, talc, glass flake, glass microspheres, metal oxides such as titanium dioxide, zinc sulfide, ground quartz, and the like. The amount of non-fibrous filler can be in a range of between 0 wt. % and 50 wt. % based on the weight of the entire composition.

The thermoplastic polyester compositions can optionally comprise both a reinforcing fiber and a platy filler. Combinations of glass fibers, carbon fibers or ceramic fibers with a platy filler, for example mica or flaked glass, can give enhanced properties. In general, the flat, plate-like filler has a length and width at least ten times greater than its thickness, where the thickness is from 1 to 1000 microns. Combinations of rigid fibrous fillers with flat, plate-like fillers can reduce warp of the molded article.

The thermoplastic polyester composition can optionally comprise a charring polymer. A charring polymer is a polymer that has not more than 85% weight loss at 400° C. to 500° C. upon heating under nitrogen using a thermogravimetric analysis (TGA) at a heating rate of 20° C. per minute. Typical charring polymers include polyetherimides, poly(phenylene ether), poly(phenylenesulfide), polysulfones, polyethersulfones, poly(phenylenesulfide oxide) (PPSO), and polyphenolics (e.g., novolacs). The charring polymer can be present in an amount from 0.1 to 15 wt. %, based on the total weight of the thermoplastic polyester composition. In a specific embodiment, a polyetherimide is present, specifically an aromatic polyetherimide. When present, the polyetherimide can be in an amount from more than 0 to 25 wt. %, specifically 0.1 to 25 wt. %, even more specifically from 2 to 8 wt. %, each based on the total weight of the composition. The presence of a polyetherimide in thermoplastic polyester compositions comprising aluminum phosphinate can further improve the mechanical properties of the compositions, in particular tensile strength and impact properties. High temperature molding stability can also be further improved, as well as melt stability. In one embodiment, the thermoplastic polyester compositions contain less than 10 wt % of a polyetherimide, based on the total weight of the composition. In a unique advantage of the current compositions, improved mechanical properties are obtained in the absence of a charring polymer, in particular, in the absence of a polyetherimide.

With the proviso that flame retardance properties and mechanical properties, such as ductility, tensile stress at break, and flexural modulus are not adversely affected, the thermoplastic polyester compositions can, optionally, further comprise other known additives used in thermoplastic polyester compositions such as non-reinforcing fillers, stabilizers such as antioxidants, thermal stabilizers, radiation stabilizers, and ultraviolet light absorbing additives, mold release agents, plasticizers, quenchers, lubricants, antistatic agents and processing aids. A combination comprising one or more of the foregoing or other additives can be used. A specific example of an additive is pentaerythritol tetrastearate. When used, the additives are present in an amount of 0.01 to 5 wt. %, specifically 0.05 to 2 wt. %.

Other additives, such as dyes, pigments, laser marking additives, and the like can be added for their known purposes. Where it is important to make compositions having a light gray or a white appearance, the thermoplastic polyester composition can further include a mixture of zinc sulfide and zinc oxide in sufficient amounts to produce a composition having a light gray to white appearance. The specific amounts of mixtures of zinc sulfide and zinc oxide can vary, depending on the application. In one embodiment, the zinc sulfide is present in an amount that is at least 3 wt. %, based on the total weight of the thermoplastic polyester composition. In another embodiment, the zinc oxide is present in an amount that is at least 0.05 wt. %, based on the total weight of the composition. In another embodiment, the zinc sulfide is present in an amount ranging from 3 to 14 wt. %, based on the total weight of the composition. In another embodiment, the zinc oxide is present in an amount ranging from 0.05 to 14 wt. %, based on the total weight of the composition. The light gray or white composition can have LAB values that vary. The use of a mixture of zinc sulfide and zinc oxide produces a material of light gray or white appearance that does not emit an unpleasant odor that results from the formation of hydrogen sulfide. Other colors will be apparent to one of ordinary skill in the art.

In an advantageous feature, the thermoplastic polyester composition possesses good flame retardancy substantially in the absence of a halogenated, in particular a chlorinated and/or brominated organic flame retardant compounds. In one embodiment, the thermoplastic polyester compositions comprise from more than 0 to less than 5 wt. % halogen, more specifically chlorine and/or bromine, based on the total weight of the composition. In another embodiment, the composition comprises more than 0 to less than 2 wt. % halogen, more specifically chlorine and/or bromine, based on the total weight of the composition. In still another embodiment, the composition comprises less than 1000 ppm, less than 500 ppm, or less than 100 ppm of a halogen selected from the group consisting of bromine, chlorine, and combinations thereof.

The thermoplastic polyester compositions can be prepared by blending the components of the composition so that they are homogeneously dispersed in a continuous matrix of the polyester. A number of blending processes can be used. In an exemplary process, the polyester, phosphinate or diphosphinate, copolyetherester; and optionally a reinforcing fiber and/or other additives are mixed in an extrusion compounder and extruded to produce molding pellets. In another process, the components, including any reinforcing fibers and/or other additives, are mixed with the polyester by dry blending, fluxed on a mill and either comminuted or extruded and chopped. The components can also be mixed and directly molded, e.g. by injection or transfer molding. All of the components are dried as much as possible prior to blending. In addition, compounding is carried out with as short a residence time in the machine as possible and at the lowest possible temperature to minimize loss of components by decomposition or volatilization. The temperature is carefully controlled, and friction heat is utilized.

In one embodiment, the components are pre-compounded, pelletized, and then molded. Pre-compounding can be carried out in known equipment. For example, after pre-drying the polyester composition (e.g., for four hours at 120° C.), a single screw extruder can be fed with a dry blend of the ingredients, the screw employed having a long transition section to ensure proper melting. Alternatively, a twin-screw extruder with intermeshing co-rotating screws can be fed with polyester and other components at the feed port and reinforcing fibers (and other additives) can optionally be fed downstream. In either case, a generally suitable melt temperature will be 230° C. to 300° C. The pre-compounded components can be extruded and cut up into molding compounds such as granules, pellets, and the like by standard techniques. The granules or pellets can then be molded in any known equipment used for molding thermoplastic compositions, such as a Newbury or van Dorn type injection-molding machine with cylinder temperatures at 230° C. to 280° C., and mold temperatures at 55° C. to 95° C. The granules and pellets can also be extruded into films, sheets. The articles formed by molding or extrusion of the thermoplastic polyester compositions possess an excellent balance of flame retardance, ductility, tensile strength and flexural modulus.

In one embodiment, a mixture of zinc sulfide and zinc oxide is added in amounts that (i) produce a composition having a light gray or white appearance and (ii) inhibit formation of hydrogen sulfide. Hydrogen sulfide has an offensive odor. Therefore inhibiting the formation of hydrogen sulfide is highly desirable. In a specific embodiment, the zinc sulfide is present in an amount of 3 to 14 wt. %, based on the total weight of the thermoplastic polyester composition, and the zinc oxide is present in an amount of 0.05 to 14 wt. %, based on the total weight of the composition.

The thermoplastic polyester compositions have excellent flame retardancy when molded into either thick or thin articles. One set of test conditions commonly accepted and used as a standard for flame retardancy is set forth in Underwriters Laboratories, Inc. Bulletin 94, which prescribes specific conditions under which the self-extinguishing characteristics of a material are rated. A 0.8 mm thick molded article comprising the thermoplastic polyester composition has a UL-94 flammability rating of V0.

A molded article comprising the thermoplastic polyester composition has a MVR of 10 to 70 cm$^3$/10 min., more specifically 15 to 50 cm$^3$/10 min, measured in accordance with ISO11443 at 250° C. and 2.16 kg.

A molded article comprising the thermoplastic polyester composition has a tensile elongation at break of at least 1%, specifically at least 4%, and more specifically at least 10%, as measured in accordance with ASTM 790 on molded samples having a thickness of 3.2 mm. A molded article comprising the thermoplastic polyester composition has a ductility, as measured by the difference between tensile elongation at break and tensile elongation at yield, of at least 1%, specifically at least 4%, and more specifically at least 10%.

A molded article comprising the thermoplastic polyester composition has a tensile stress at break of at least 15 MPa, specifically at least 30 MPa, and more specifically at least 35 MPa, as measured in accordance with ASTM D 638 on molded samples having a thickness of 3.2 mm.

A molded article comprising the thermoplastic polyester composition has a flexural modulus of from 1,700 to 4,500 MPa, more specifically 2,000 to 4,000 MPa, measured in accordance with ASTM 790.

In a specific embodiment, the thermoplastic polyester composition can have an advantageous combination of highly useful physical properties. The thermoplastic polyester composition can have a UL-94 flammability rating of V0 when molded into a sample having a thickness of 0.8 mm, a tensile elongation at break of at least 1% and a tensile stress at break of at least 15 MPa, as measured in accordance with ASTM D 638, when molded into a sample having a thickness of 3.2 mm, and a flexural modulus of 1,700 to 4,500 MPa, as measured in accordance with ASTM 790, also when molded into a sample having a thickness of 3.2 mm.

In a more specific embodiment, the thermoplastic polyester composition can have a UL-94 flammability rating of V0 when molded into a sample having a thickness of 0.8 mm, a tensile elongation of at least 4% and a tensile stress at break of at least 15 MPa, as measured in accordance with ASTM D 638, when molded into a sample having a thickness of 3.2 mm, and a flexural modulus of 2,000 to 4,000 MPa, as measured in accordance with ASTM 790, also when molded into a sample having a thickness of 3.2 mm.

One or more of the foregoing properties can be achieved by a thermoplastic polyester composition that consists essentially of a polyester; a phosphinate and/or diphosphinate, an anti-dripping agent, and optionally glass fibers, and/or one or more additives selected from the group consisting of a mold release agent, an antioxidant, a thermal stabilizer, and a UV stabilizer.

In a specific embodiment, the thermoplastic polyester composition consists essentially of, based on the total weight of the composition: from 20 to 95 wt. % of a polyester comprising poly(butylene terephthalate); from 1 to 35 wt. % of a phosphinate of formula (I)

$$[(R^1)(R^2)(PO)-O]^-_3 Al^{3+}$$ (Ia), a diphosphinate of the formula (IIa)

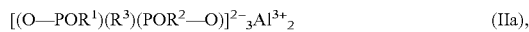

and/or a polymer derived from (Ia) or (IIa), wherein $R^1$ and $R^2$ are identical or different and are H, $C_1$-$C_6$ linear or branched alkyl, or $C_6$-$C_{10}$ aryl; and $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; from 0.1 to less than 20 wt. %, of a copolyetherester; from 0.1 to 5 wt. % of an anti-dripping agent; from 0 to 4.5 wt. %, of a glass fiber; and from 0 to 5 wt. % of an additive selected from the group consisting of a mold release agent, an antioxidant, a thermal stabilizer, and a UV stabilizer, wherein a 0.8 mm thick molded sample comprising the thermoplastic polyester composition has a UL-94 flammability rating of V0.

In a more specific embodiment, the thermoplastic polyester composition consists essentially of, based on the total weight of the composition: from 20 to 95 wt. % of poly (butylene terephthalate); from 1 to 35 wt. % of aluminum diethyl phosphinate; from 0.1 to less than 20 wt. % polybutylene terephthalate polytetrahydrofuran block copolymer; from 0.1 to 5 wt. % of an anti-dripping agent; from 0 to 4.5 wt. % of glass fiber; and from 0 to 5 wt. % of an additive selected from the group consisting of a mold release agent, an antioxidant, a thermal stabilizer, an antioxidant, and a UV stabilizer; and having a UL-94 flammability rating of V0 when molded into a sample having a thickness of 0.8 mm, a tensile elongation of at least 4%, as measured in accordance with ASTM D 638, when molded into a sample having a thickness of 3.2 mm, and a flexural modulus of 2,000 to 4,000 MPa, as measured in accordance with ASTM 790, also when molded into a sample having a thickness of 3.2 mm.

Also disclosed are molded articles comprising the thermoplastic polyester composition, such as electric and electronic parts, including, for example, connectors, fans used in electronic devices such as computers, circuit breakers, lamp holders, fusers, power distribution box, enclosures, power plugs. A method of forming an article comprises extruding, calendaring, molding, or injection molding the thermoplastic polyester composition to form the article. A specific article is a connector. Another specific article is a fan, e.g. a fan used in electronic devices such as computers.

Advantageously, our invention provides previously unavailable benefits. It provides thermoplastic polyester compositions having a unique combination of desirable properties not all easily obtained in the same composition, including flame retardance, tensile ductility, tensile strength, and stiffness. The thermoplastic polyester compositions can optionally comprise a reinforcing fiber, for example, a glass fiber, to further enhance tensile strength and flexural modulus without sacrificing flame retardance. Articles comprising the thermoplastic polyester composition having this unique combination of flame retardance and mechanical properties have many applications in the electronics industry.

The invention is further illustrated by the following non-limiting examples.

EXAMPLES

The materials in Table 2 were used in the examples that follow.

TABLE 2

| Materials | |
|---|---|
| Abbreviation | Description |
| VALOX 195 | Poly(1,4-butylene terephthalate) (PBT) from SABIC Innovative Plastics, intrinsic viscosity of 0.66 dl/g as measured in a 60:40 phenol/tetrachloroethane mixture |
| VALOX 315 | Poly(1,4-butylene terephthalate) (PBT) from SABIC Innovative Plastics, intrinsic viscosity of 1.2 dl/g as measured in a 60:40 phenol/tetrachloroethane mixture. |
| HYTREL 4056 | Copolyetherester (TPEE) with 55% PBT and 45% poly(tetrahydrofuran), from Dupont Co. |
| ALP | Aluminum diethyl phosphinate, sold as OP1240 from Clariant |
| EEA | Ethylene-ethyl acrylate copolymer with 17 wt. % ethyl acrylate on average |
| EVA | Ethylene-Vinyl Acetate copolymer with 25% vinyl acetate, sold as Elvax 350 from Dupont Co. |
| MBS | Methacrylate-Butadiene-Styrene emulsion terpolymer impact modifier with core-shell structure. From Rohm & Haas EXL2691 |
| ABS | Acrylonitrile-Butadiene-Styrene emulsion terpolymer impact modifier with core-shell structure from SABIC Innovative Plastics |
| Glass fiber | E glass with diameter of 10 or 13 um. Sizing-coated glass fibers are commercially available from Owens Corning Fiberglass as, for example, OCF K filament glass fiber 183F. |
| LOTADER AX8900 | Random terpolymer of ethylene, methyl acrylate, and glycidyl methacrylate from Arkema |
| TSAN | 50/50 wt. % polytetrafluoroethylene (PFTE) encapsulated with poly(styrene-co-acrylonitrile) (SAN) from SABIC Innovative Plastics |
| AO1010 | Hindered phenol, pentaerythritol tetrakis(3,5-di-tert-butyl-4-hydroxyhydrocinnamate) sold as Irganox 1010 from Ciba Specialty Chemicals |
| PETS | Pentaerythritol tetrastearate |

The materials as shown in Tables 2-6 were tumble blended and then extruded on a 27 mm twin screw extruder with a vacuum vented mixing screw, at a barrel and die head temperature between 240° C. and 265° C. and a screw speed of 300 rpm. The extrudate was cooled through a water bath prior to pelletization. ASTM Izod and flexural bars were injection molded on a van Dorn molding machine with a set temperature of approximately 240° C. to 265° C. The pellets were dried for 3 hours to 4 hours at 120° C. in a forced air-circulating oven prior to injection molding.

Flammability tests were performed following the procedure of Underwriter's Laboratory Bulletin 94 entitled "Tests for Flammability of Plastic Materials, UL94." According to this procedure, the materials were classified as either UL94 V-0, UL94 V-1 or UL94 V-2 on the basis of the test results obtained for five samples. The procedure and criteria for each of these flammability classifications according to UL94 are, briefly, as follows. A total of 10 specimens (2 sets of 5) are tested per thickness. Five of each thickness was tested after conditioning for 48 hours at 23° C., 50% relative humidity. The other five of each thickness are tested after conditioning for seven days at 70° C. The bar is mounted with the long axis vertical for flammability testing. The specimen is supported such that its lower end is 9.5 mm above the Bunsen burner tube. A blue 19 mm high flame is applied to the center of the lower edge of specimen for 10 seconds. The time until the flaming of the bar ceases is recorded. If burning ceases, the flame is re-applied for an additional 10 seconds. Again the time until the flaming of the bar ceases is recorded. If the specimen drips particles, these shall be allowed to fall onto a layer of untreated surgical cotton placed 305 mm below the specimen.

Criteria for flammability classifications according to UL94:

V0: Individual flame time (s) <=10, Total flame time of 5 specimen (s) <=50, Glowing time of individual specimen (s) <=30, no particles ignite cotton.
V1: Individual flame time (s) <=30, Total flame time of 5 specimen (s) <=250, Glowing time of individual specimen (s) <=30, no particles ignite cotton.
V2: Individual flame time (s) <=30, Total flame time of 5 specimen (s) <=250, Glowing time of individual specimen (s) <=30, particles ignite cotton allowed.

Notched and unnotched Izod testing was performed on 75 mm×12.5 mm×3.2 mm bars in accordance with ASTM D256. Bars were notched prior to mechanical property testing and were tested at 23° C.

Flexural properties were measured in accordance with ASTM 790 on molded samples having a thickness of 3.2 mm.

Tensile properties were measured in accordance with ASTM D 638 on molded samples having a thickness of 3.2 mm.

Heat deflection temperature was measured on molded samples having a thickness of 3.2 mm in accordance with ASTM D 648.

Melt volume-flow rate (MVR) was measured in accordance with ISO 11443 at 250° C.

Examples 1-6 and Comparative Examples 1-16

The instant invention is a thermoplastic polyester composition free of halogenated flame retardant having flame performance of UL94 V0, good ductility, tensile strength, and stiffness, a process for making the thermoplastic polyester composition, and articles thereof, and is illustrated by these examples.

Example 1 and Comparative Examples 1-6

The purpose of these examples was to compare the performance of the inventive thermoplastic polyester composition containing 10% copolyetherester (HYTREL 4056) to compositions containing EVA or EEA instead of a copolyetherester. The polyester composition E1 exemplified an embodiment of the invention while the compositions CE1 to CE6 were used for comparison.

The compositions were made in accordance to the procedure described above. Table 3 summarizes flame performance and physical properties, including tensile elongation at break and flexural modulus, of polyester compositions E1 and CE1 to CE6 with non-halogenated flame retardant aluminum diethyl phosphinate (ALP).

TABLE 3

Polyester Compositions and Properties

| | Unit | E1 | CE1 | CE2 | CE3 | CE4 | CE5 | CE6 |
|---|---|---|---|---|---|---|---|---|
| Composition | | | | | | | | |
| VALOX 315 | % | 76.4 | 86.4 | 76.4 | 66.4 | 76.4 | 66.4 | 66.4 |
| HYTREL 4056 | % | 10.0 | | | | | | 20.0 |
| EEA | % | | | 10.0 | 20.0 | | | |
| EVA | % | | | | | 10.0 | 20.0 | |
| ALP | % | 13.0 | 13.0 | 13.0 | 13.0 | 13.0 | 13.0 | 13.0 |
| TSAN | % | 0.50 | 0.50 | 0.50 | 0.50 | 0.50 | 0.50 | 0.50 |
| AO1010 | % | 0.10 | 0.10 | 0.10 | 0.10 | 0.10 | 0.10 | 0.10 |
| Performance Properties | | | | | | | | |
| UL94 V0 at 0.8 mm | | Yes | Yes | No | No | No | No | Yes |
| Tensile Elongation at Break | % | 10 | 3 | 10 | 22 | 15 | 27 | 17 |
| Tensile Elongation at Yield | % | 4 | 3 | 3 | 3 | 3 | 3 | 6 |
| Tensile Stress at Yield | MPa | 35.7 | 48.3 | 36.7 | 30.2 | 36.6 | 29 | 30.1 |
| Tensile Stress at Break | MPa | 35.8 | 47.9 | 35.7 | 29.1 | 35 | 27.4 | 30.4 |
| MVR (250° C., 2.16 kg) | cm³/10 min | 39.8 | 37.1 | 23.8 | 16.18 | 22.1 | 15.37 | 40.2 |
| Flexural Modulus | MPa | 2250 | 3170 | 2460 | 1970 | 2460 | 1890 | 1680 |
| Flexural Stress at Yield | MPa | 66.3 | 89.9 | 67.7 | 54.8 | 67.2 | 51.5 | 52.8 |
| Unnotched Impact Strength at 23° C. | J/m | 25.3 | 23.8 | 25.7 | 30.8 | 27.7 | 39.5 | 35.5 |
| Notched Impact Strength at 23° C. | J/m | 489 | 392 | 656 | 816 | 639 | 726 | 887 |

CE1 has desired flame performance of UL94 V0 at 0.8 mm but has poor tensile elongation at beak. The material breaks at very low tensile elongation of 3%. The fact that tensile elongation at break and yield has the same value indicates that the material breaks without yielding behavior, i.e. it lacks tensile ductility. The brittle failure upon tensile testing indicates that there is need to improve the composition further for certain applications where tensile elongation is a critical property.

CE2 and CE3 with EEA as an additive have the desired tensile elongation at break. However, the desired flame performance of UL94 V0 at 0.8 mm could not be achieved for CE2 and CE3.

CE4 and CE5 with EVA as an additive also have desired tensile elongation at break. However again, the desired flame performance of UL94 V0 at 0.8 mm could not be achieved for CE4 and CE5.

In contrast to comparative examples CE1-CE6, the inventive polyester composition of E1 with HYTREL 4056 shows UL94 V0 performance at a thickness of 0.8 mm and good tensile elongation. The addition of polyester-polyether block copolymer to polyester composition E1 increases tensile ductility compared to CE1 to a satisfactory level while maintaining the UL94 V0 performance of CE1.

CE6 shows UL94 V0 performance at a thickness of 0.8 mm and good tensile elongation. However, the flexural modulus was too low for the target application.

Examples 2-3 and Comparative Examples 7-12

The purpose of these examples was to compare the performance of compositions containing 5 and 10 wt. % copolyetherester (HYTREL 4056) to compositions MBS, ABS, or LOTADER AX8900 instead of copolyetherester. Compositions used in Examples E5 and E6 exemplified embodiments of our invention while compositions in Examples E7, E8, and E9, comprising MBS, ABS, and LOTADER AX8900 were used for comparison.

The compositions were made in accordance to the procedure described above. Table 4 summarizes flame performance and physical properties, including tensile elongation at break and flexural modulus, of polyester compositions with non-halogenated flame retardant aluminum diethyl phosphinate (ALP). Various impact modifiers were utilized in the comparative examples.

ness of 0.8 mm and good tensile elongation. The use of polyester-polyether block copolymer enhances the tensile ductility of CE1 while at the same time maintaining its UL94 V0 performance.

Examples 4-5 and Comparative Examples 13-14

The compositions were made in accordance to the procedure described above. Table 5 summarizes flame performance and physical properties, including tensile elongation at break, tensile strength at break, and flexural modulus, of compositions with non-halogenated flame retardant aluminum diethyl phosphinate (ALP). Glass fiber was added at relative low levels of 1-10% to improve the tensile strength (tensile stress at beak) and flexural modulus of the compositions while maintaining flame performance of UL94 V0 and the ductile tensile properties.

TABLE 5

Polyester Compositions and Properties

|  | Unit | E4 | E5 | CE13 | CE14 |
|---|---|---|---|---|---|
| Composition |  |  |  |  |  |
| VALOX 315 | % | 39.55 | 38.80 | 37.55 | 35.05 |
| VALOX195 | % | 39.55 | 38.80 | 37.55 | 35.05 |

TABLE 4

Polyester Compositions and Properties

|  | Units | E2 | E3 | CE7 | CE8 | CE9 | CE10 | CE11 | CE12 |
|---|---|---|---|---|---|---|---|---|---|
| Composition |  |  |  |  |  |  |  |  |  |
| VALOX 315 | % | 40.05 | 37.55 | 40.05 | 37.55 | 40.05 | 37.55 | 40.05 | 37.55 |
| VALOX 195 | % | 40.05 | 37.55 | 40.05 | 37.55 | 40.05 | 37.55 | 40.05 | 37.55 |
| ALP | % | 14 | 14 | 14 | 14 | 14 | 14 | 14 | 14 |
| HYTREL 4056 | % | 5 | 10 |  |  |  |  |  |  |
| MBS | % |  |  | 5 | 10 |  |  |  |  |
| ABS | % |  |  |  |  | 5 | 10 |  |  |
| LOTADER AX8900 | % |  |  |  |  |  |  | 5 | 10 |
| TSAN | % | 0.5 | 0.5 | 0.5 | 0.5 | 0.5 | 0.5 | 0.5 | 0.5 |
| AO1010 | % | 0.2 | 0.2 | 0.2 | 0.2 | 0.2 | 0.2 | 0.2 | 0.2 |
| PETS | % | 0.2 | 0.2 | 0.2 | 0.2 | 0.2 | 0.2 | 0.2 | 0.2 |
| Performance properties |  |  |  |  |  |  |  |  |  |
| UL94 V0 at 0.8 mm |  | Yes | Yes | No | No | No | No | No | No |
| Tensile Elongation at Break | % | 38 | 34 | 40 | 35 | 39 | 34 | 36 | 31 |
| Tensile Elongation at Yield | % | 2.8 | 3.4 | 2.2 | 2.1 | 2.1 | 2 | 2.5 | 2.9 |
| Tensile Stress at Yield | MPa | 37.6 | 33.5 | 40.4 | 35.2 | 40.2 | 35.7 | 35.7 | 29.8 |
| Tensile Stress at Break | MPa | 37.6 | 33.7 | 40.3 | 34.6 | 39.4 | 33.8 | 35.6 | 30.5 |
| MVR (250° C., 2.16 kg) | cm³/10 min | 27.1 | 24.3 | 19.18 | 11.56 | 15.12 | 8.86 | 5.43 | 1.38 |
| Flexural Modulus | MPa | 2640 | 2260 | 2990 | 2690 | 3070 | 2790 | 2540 | 2060 |
| Flexural Stress at Yield | MPa | 73.1 | 64.6 | 78.1 | 67.7 | 78.7 | 69.1 | 69.9 | 58.4 |
| Unnotched Impact Strength at 23° C. | J/m | 35.1 | 47.6 | 33.7 | 33.2 | 32.7 | 46.7 | 31.2 | 51 |
| Notched Impact Strength at 23° C. | J/m | 464 | 752 | 410 | 485 | 524 | 771 | 561 | 929 |

CE7 and CE8 with MBS as an impact modifier have the desired tensile elongation at break. However, the desired flame performance of UL94 V0 at 0.8 mm was not achieved.

CE9 and CE10 with ABS as an impact modifier have the desired tensile elongation at break. However, the desired flame performance of UL94 V0 at 0.8 mm was not achieved.

CE11 and CE12 with LOTADER AX8900, a random terpolymer of ethylene, methyl acrylate, and glycidyl methacrylate ester as an impact modifier, have the desired tensile elongation at break. However, the desired flame performance of UL94 V0 at 0.8 mm was not achieved.

In contrast, inventive polyester compositions E2 and E3 with HYTREL 4056 show UL94 V0 performance at a thick- TABLE 5-continued Polyester Compositions and Properties

|  | Unit | E4 | E5 | CE13 | CE14 |
|---|---|---|---|---|---|
| ALP | % | 14.00 | 14.00 | 14.00 | 14.00 |
| HYTREL 4056 | % | 5.00 | 5.00 | 5.00 | 5.00 |
| Glass fiber | % | 1.00 | 2.50 | 5.00 | 10.00 |
| TSAN | % | 0.50 | 0.50 | 0.50 | 0.50 |
| AO1010 | % | 0.20 | 0.20 | 0.20 | 0.20 |
| PETS | % | 0.20 | 0.20 | 0.20 | 0.20 |

TABLE 5-continued

Polyester Compositions and Properties

|  | Unit | E4 | E5 | CE13 | CE14 |
|---|---|---|---|---|---|
| Performance properties |  |  |  |  |  |
| UL94 V0 at 0.8 mm |  | Yes | Yes | No | No |
| Tensile Elongation at Break | % | 7.8 | 4.6 | 3.8 | 3.1 |
| Tensile Elongation at Yield | % | 2.7 | 3.5 | 3.6 | 3.0 |
| Tensile Stress at Yield | MPa | 40 | 43.5 | 49.8 | 60.2 |
| Tensile Stress at Break | MPa | 39.4 | 43.6 | 49.9 | 60.2 |
| MVR (250° C., 2.16 kg) | $cm^3$/10 min | 21.8 | 19.35 | 19.63 | 19.11 |
| Flexural Modulus | MPa | 2730 | 3040 | 3330 | 4300 |
| Flexural Stress at Yield | MPa | 73.7 | 80.8 | 88.7 | 102 |
| Unnotched Impact Strength at 23° C. | J/m | 39.8 | 40.8 | 41.8 | 132 |
| Notched Impact Strength at 23° C. | J/m | 507 | 448 | 454 | 447 |

CE13 and CE14 with 5-10% glass fiber have the desired stiffness and tensile elongation at break. However, the fact that tensile elongation at break and yield have nearly the same value for these compositions indicates that the material breaks without yielding behavior, i.e. they lack tensile ductility. Surprisingly, the addition of glass fiber at these levels results in failure of the compositions to meet the UL94 V0 standard.

In contrast, inventive compositions E4 and E5 with glass fiber at 1.0-2.5% show UL94 V0 performance at a thickness of 0.8 mm and good tensile elongation. The tensile elongation at break is substantially higher than tensile elongation at yield, indicating ductile rather than brittle failure. In addition 10-20% improvement in tensile strength and flexural modulus as compared to E2 in Table 3 can be achieved with 2.5% of glass fiber. Polyester compositions comprising polyester-polyether block copolymer and glass fiber at less than 5% surprisingly meets the UL94 V0 standard and has a good blend of tensile elongation, tensile strength, and flexural modulus properties.

Example 6 and Comparative Examples 15-16

The compositions were made in accordance to the procedure described above. Table 6 summarizes flame performance and physical properties, including tensile elongation at break and flexural modulus, of compositions with non-halogenated flame retardant aluminum diethyl phosphinate (ALP) and melamine polyphosphate.

TABLE 6

Polyester Compositions and Properties

|  | Unit | E6 | CE15 | CE16 |
|---|---|---|---|---|
| Composition |  |  |  |  |
| VALOX 315 | % | 76 | 82 | 72 |
| HYTREL 4056 | % | 10 | — | 10 |
| Melamine polyphosphate | % | — | 5 | 5 |
| ALP | % | 13 | 13 | 13 |
| TSAN | % | 0.5 | 0.5 | 0.5 |
| AO1010 | % | 0.1 | 0.1 | 0.1 |
| Performance Properties |  |  |  |  |
| UL94 V0 at 0.8 mm |  | Yes | No | No |
| Tensile Elongation at Break | % | 10 | 2.3 | 8 |
| Tensile Elongation at Yield | % | 4 | 2.6 | 3 |
| Tensile Stress at Yield | MPa | 36 | 50 | 39 |
| Tensile Stress at Break | MPa | 36 | 50 | 37 |
| MVR (250° C., 2.16 kg) | $cm^3$/10 min | 40 | 26 | 21 |
| Flexural Modulus | MPa | 2250 | 3330 | 2410 |
| Flexural Stress at Yield | MPa | 66 | 86 | 65 |
| Unnotched Impact Strength at 23° C. | J/m | 25 | 34 | 35 |
| Notched Impact Strength at 23° C. | J/m | 489 | 280 | 337 |

Surprisingly the addition of 5% melamine polyphosphate in CE15 and CE16 decreased flame resistance. CE15 and CE16 failed to meet the UL94 V0 standard, while E6 without melamine polyphosphate met it. It is not understood why melamine polyphosphate reduces flame performance in the compositions.

Examples 6-7 and Comparative Examples 17-20

The compositions were made in accordance to the procedure described above. Table 7 summarizes the effect of epoxy compound on flame performance and physical properties of polyester compositions with non-halogenated flame retardant aluminum diethyl phosphinate (ALP).

TABLE 7

Polyester Compositions and Properties

|  | Unit | E7 | E8 | CE17 | CE18 | CE19 | CE20 |
|---|---|---|---|---|---|---|---|
| Item Description |  |  |  |  |  |  |  |
| VALOX 315 | % | 40.1 | 37.6 | 37.6 | 35.1 | 35.1 | 32.6 |
| VALOX195 | % | 40.1 | 37.6 | 37.6 | 35.1 | 35.1 | 32.6 |
| ALP | % | 14.0 | 14.0 | 14.0 | 14.0 | 14.0 | 14.0 |
| HYTREL 4056 | % | 5.0 | 10.0 | 5.0 | 10.0 | 5.0 | 10.0 |
| LOTADER AX8900 |  |  |  | 5.0 | 5.0 | 10.0 | 10.0 |
| TSAN | % | 0.50 | 0.50 | 0.50 | 0.50 | 0.50 | 0.50 |
| AO1010 | % | 0.20 | 0.20 | 0.20 | 0.20 | 0.20 | 0.20 |
| PETS | % | 0.20 | 0.20 | 0.20 | 0.20 | 0.20 | 0.20 |
| Physical properties |  |  |  |  |  |  |  |
| UL94 V0 at 0.8 mm | % | Yes | Yes | No | No | No | No |
| Tensile Stress at Break | MPa | 35.9 | 31.6 | 25.6 | 24.6 | 24.9 | 20 |
| Tensile Stress at Yield | MPa | 35.9 | 31 | 24.4 | 24.5 | 24.8 | 19.9 |

TABLE 7-continued

| Polyester Compositions and Properties | | | | | | | |
|---|---|---|---|---|---|---|---|
| | Unit | E7 | E8 | CE17 | CE18 | CE19 | CE20 |
| MVR (250° C., 2.16 kg) | Cm³/10 min | 30.4 | 44.7 | 6.7 | 0.0 | 8.2 | 0.0 |
| Flexural Modulus | MPa | 2840 | 2280 | 2030 | 1580 | 1650 | 1360 |
| Flexural Stress at Yield | MPa | 69.5 | 55.2 | 47.2 | 43.8 | 44 | 35.5 |

The results for CE17-CE20 in Table 6 demonstrate that the addition of even a small quantity (5% or 10%) of an epoxy polymer (Locater AX8900) decreased UL94 flame performance. Therefore, it is not suitable for use in the polyester composition of the present invention While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic polyester composition comprising, based on the total weight of the composition:
   from 20 to 95 wt. % of a polyester;
   from 1 to 35 wt. % of a phosphorous flame retardant comprising:
   a phosphinate of formula (I)

$$[(R^1)(R^2)(PO)-O]^-_m M^{m+}  \quad (I),$$

a diphosphinate of formula (II)

$$[(O-POR^1)(R^3)(POR^2-O)]^{2-}_n M^{m+}_x \quad (II),$$

and/or a polymer derived from the phosphinate of formula (I) or the diphosphinate of the formula (II),
   wherein $R^1$ and $R^2$ are identical or different and are H, linear or branched $C_1$-$C_6$ alkyl, or $C_6$-$C_{10}$ aryl; $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2;
   from 0.1 to less than 20 wt. % of a copolyetherester;
   from 0.1 to 5 wt. % of an anti-dripping agent;
   from 0 to 4.5 wt. % of a reinforcing fiber; and
   from 0 to 5 wt. % of an additive selected from the group consisting of a mold release agent, an antioxidant, a thermal stabilizer, a UV stabilizer, and a combination comprising one or more of the foregoing additives;
   wherein a 0.8 mm thick molded sample comprising the composition has a UL-94 flammability rating of V0 and a 3.2 mm thick molded sample exhibits at least one of the following properties: a tensile elongation at break of at least 4% and a tensile stress at break of at least 15 MPa, as measured in accordance with ASTM D 638, and a flexural modulus of 2,000 to 4,500 MPa, as measured in accordance with ASTM 790, and wherein melamine polyphosphate and epoxy polymer are both not present in the composition.

2. The thermoplastic polyester composition of claim 1, wherein the polyester is present in an amount from 70 to 90 wt. %, based on the total weight of the composition.

3. The thermoplastic polyester composition of claim 1, wherein the flame retardant consists of the phosphinate of formula (I), the diphosphinate of formula (II), and/or the polymer derived from the phosphinate of formula (I) or the diphosphinate of the formula (II).

4. The thermoplastic polyester composition of claim 1, wherein the phosphinate of formula (I), the diphosphinate of formula (II), and/or a polymer thereof is present in an amount from 5 to 20 wt. %, based on the total weight of the composition.

5. The thermoplastic polyester composition of claim 1, wherein the copolyetherester is present in an amount from 2.5 to 15 wt. %, based on the total weight of the compositon.

6. The thermoplastic polyester composition of claim 1, wherein the polyester is a poly(alkylene terephthalate).

7. The thermoplastic polyester composition of claim 1, wherein the polyester is poly(butylene terephthalate).

8. The thermoplastic polyester composition of claim 1, wherein $R^1$ and $R^2$ are the same and are $C_1$-$C_6$-linear or branched alkyl, or phenyl; $R^3$ is $C_1$-$C_{10}$-linear or branched alkylene, $C_6$-$C_{10}$-arylene, -alkylarylene or-arylalkylene; M is magnesium, calcium, aluminum, zinc, or a combination thereof; m is 1, 2 or 3; n is 1, 2 or 3; and x is 1 or 2.

9. The thermoplastic polyester composition of claim 1, wherein M is aluminum.

10. The thermoplastic polyester composition of claim 1, wherein the phosphorous flame retardant is of formula (I).

11. The thermoplastic polyester composition of claim 1, wherein the phosphorous flame retardant is aluminum diethyl phosphinate.

12. The thermoplastic polyester composition of claim 1, wherein the copolyetherester comprises long-chain ester units of the formula (III):

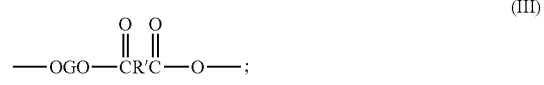

$$\text{—OGO—CR'C—O—} \quad (III)$$

and short-chain ester units having units of the formula (IV):

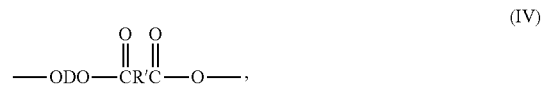

$$\text{—ODO—CR'C—O—} \quad (IV),$$

wherein R' is the divalent aromatic radical remaining after removal of the carboxyl groups from terephthalic acid, isophthalic acid, or a combination of terephthalic acid and isophthalic acid; G is the divalent polyalkylene oxide radical remaining after removal of the terminal hydroxyl groups from a poly(alkylene oxide) glycol having a number-average molecular weight of 100 to 2500; and D is the divalent alkylene radical remaining after removal of the hydroxyl groups from aliphatic diols having a molecular weight from 62 to 286.

13. The thermoplastic polyester composition of claim 1, wherein the copolyetherester is a polybutylene terephthalate polytetrahydrofuran block copolymer.

14. The thermoplastic polyester composition of claim 1, wherein the reinforcing fiber is present in an amount from 0.1 to 4.5 wt. %, based on the total weight of the composition.

15. The thermoplastic polyester composition of claim 1, wherein an impact modifier is present and is selected from the group consisting of acrylonitrile-butadiene-styrene terpolymer, methacrylate-butadiene-styrene terpolymer, ethylene-vinyl acetate copolymer, ethylene-ethyl acrylate copolymer, ethylene-methyl acrylate-maleic anhydride terpolymer, ethylene-ethyl acrylate-maleic anhydride terpolymer, ethylene-butyl acrylate-maleic anhydride terpolymer, ethylene-methyl acrylate-glycidyl methacrylate terpolymer, ethylene-glycidyl methacrylate terpolymer, and a combination of one or more of the foregoing impact modifiers.

16. The thermoplastic polyester composition of claim 1, further comprising more than 0 and less than or equal to 50 wt. % of a non-fibrous inorganic filler.

17. The thermoplastic polyester composition of claim 1, wherein the composition has less than 1000 ppm of halogen, based on the total weight of the composition.

18. The thermoplastic polyester composition of claim 1, wherein a 3.2 mm thick molded sample further exhibits at least one of the following properties: a tensile elongation at break of at least 1% and a tensile stress at break of at least 15 MPa, as measured in accordance with ASTM D 638, and a flexural modulus of 1,700 to 4,500 MPa, as measured in accordance with ASTM 790.

19. The thermoplastic polyester composition of claim 1, wherein the anti-dripping agent comprises a fluoropolymer.

20. The thermoplastic polyester composition of claim 1, wherein the anti-dripping agent is poly(tetrafluoroethylene) encapsulated by a styrene-acrylonitrile copolymer.

21. A thermoplastic polyester composition comprising, based on the total weight of the composition:
from 70 to 90 wt. % of poly(butylene terephthalate);
from 10 to 15 wt. % of aluminum diethylphosphinate;
from 5.0 to 15 wt. % of polybutylene terephthalate polytetrahydrofuran block copolymer;
from 0.1 to 5 wt. % of poly(tetrafluoroethylene) encapsulated by a styrene-acrylonitrile copolymer agent;
from 0 to 4.5 wt. % of a glass fiber; and
from 0 to 5 wt. % of an additive selected from the group consisting of a mold release agent, an antioxidant, a thermal stabilizer, a UV stabilizer, and a combination comprising one or more of the foregoing additives;
wherein a 0.8 mm thick molded sample comprising the composition has a UL-94 flammability rating of V0; and a 3.2 mm thick molded sample exhibits at least one of the following properties: a tensile elongation at break of at least 4% and a tensile stress at break of at least 15 MPa, as measured in accordance with ASTM D 638, and a flexural modulus of 2,000 to 4,500 MPa, as measured in accordance with ASTM 790, and wherein melamine polyphosphate and epoxy polymer are both not present in the composition.

22. A method for the manufacture of the composition of claim 1, comprising blending the components of the composition of claim 1.

23. An article comprising the composition of claim 1.

24. The article of claim 23, wherein the article is a connector.

25. A method of manufacturing an article, comprising shaping by extrusion, calendaring, molding, or injection molding the composition of claim 1.

26. A thermoplastic polyester composition comprising, based on the total weight of the composition:
from 70 to 95 wt. % of a polyester;
from 10 to 35 wt. % of a phosphorous flame retardant comprising:
a phosphinate of formula (I)

a diphosphinate of formula (II)

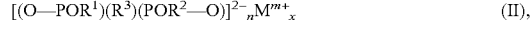

and/or a polymer derived from the phosphinate of formula (I) or the diphosphinate of the formula (II),
wherein $R^1$ and $R^2$ are identical or different and are H, linear or branched $C_1$-$C_6$ alkyl, or $C_6$-$C_{10}$ aryl; $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2;
from 5.0 to less than 20 wt. % of a copolyetherester;
from 0.1 to 5 wt. % of an anti-dripping agent;
from 0.5 to 4.5 wt. % of a reinforcing glass fiber; and
from 0 to 5 wt. % of an additive selected from the group consisting of a mold release agent, an antioxidant, a thermal stabilizer, a UV stabilizer, and a combination comprising one or more of the foregoing additives;
wherein a 0.8 mm thick molded sample comprising the composition has a UL-94 flammability rating of V0.

27. The thermoplastic polyester composition of claim 1, wherein the composition contains more than 0 to less than 5 wt. % of chlorine and/or bromine, based on the total weight of the composition.

28. The thermoplastic polyester composition of claim 1, wherein the composition contains more than 0 to less than 2 wt. % of chlorine and/or bromine, based on the total weight of the composition.

29. The thermoplastic polyester composition of claim 1, wherein the composition contains less than 500 ppm of chlorine and/or bromine, based on the total weight of the composition.

30. The thermoplastic polyester composition of claim 1, wherein the composition contains less than 100 ppm of chlorine and/or bromine, based on the total weight of the composition.

31. The thermoplastic polyester composition of claim 1, wherein the composition further comprises at least 3 wt. % zinc sulfide and at least 0.05 wt. % zinc oxide based on the total weight of the composition.

32. The composition of claim 31, wherein the zinc sulfide is present in an amount ranging from 3 to 14 wt. %, based on the total weight of the composition.

33. The composition of claim 31, wherein the zinc oxide is present in an amount ranging from 0.05 to 14 wt. %, based on the total weight of the composition.

* * * * *